UNITED STATES PATENT OFFICE.

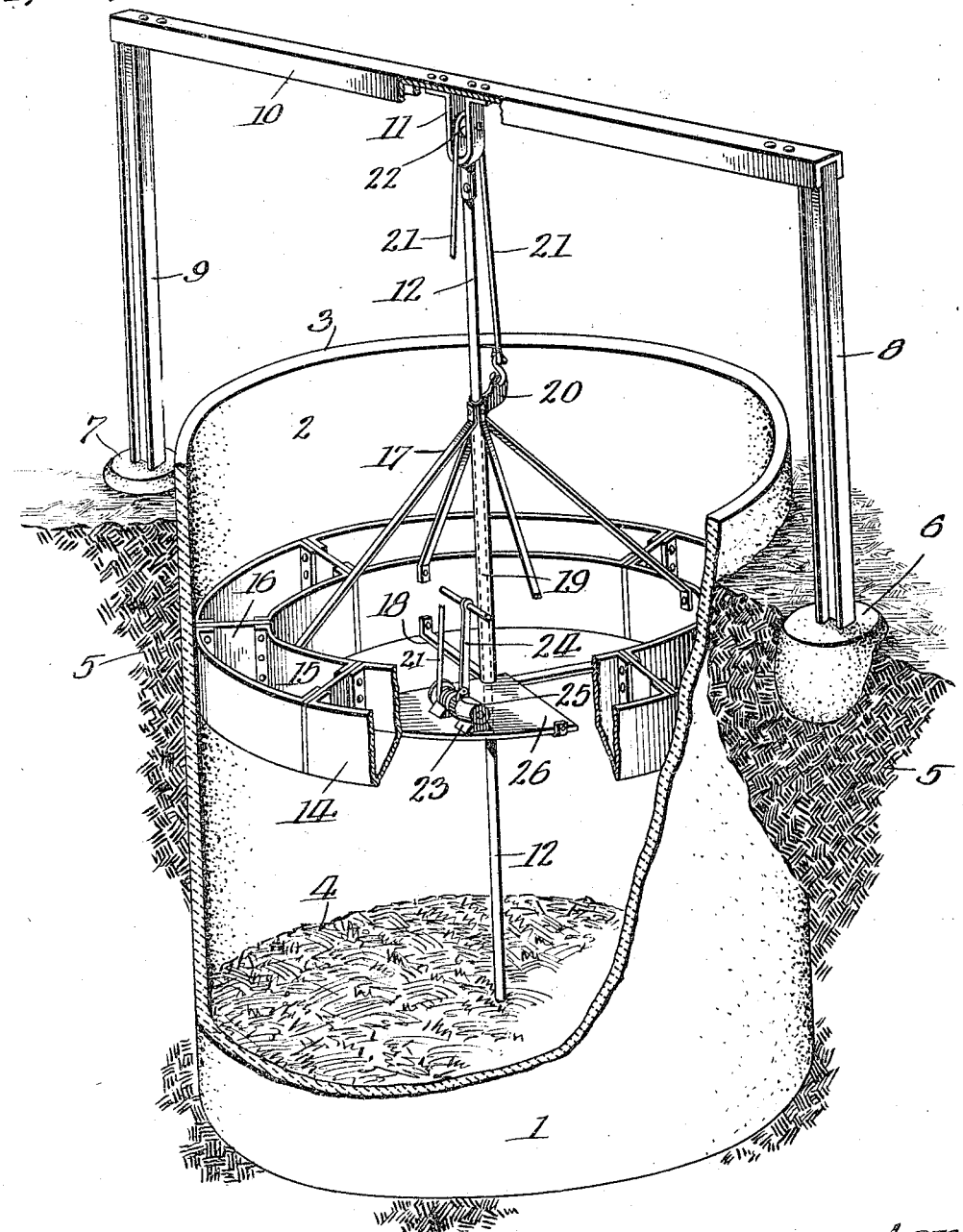

NOAH D. WILLIAMS, OF THOMAS, OKLAHOMA.

ELEVATING FEED-TROUGH FOR PIT-SILOS.

1,145,049.

Specification of Letters Patent.

Patented July 6, 1915.

Application filed January 5, 1915. Serial No. 638.

*To all whom it may concern:*

Be it known that I, NOAH D. WILLIAMS, a citizen of the United States, residing at Thomas, in the county of Custer and State of Oklahoma, have invented certain new and useful Improvements in Elevating Feed-Troughs for Pit-Silos, of which the following is a specification.

This invention relates to improvements in elevating feed troughs for pit silos, and to silo construction; and it comprises in combination with an annular pit silo, an annular feed trough adapted to be raised and lowered in said silo, a central shaft for centering and guiding said trough, and means for raising and lowering said trough in said silo, and spacing bars for spacing and supporting said trough and permitting raising and lowering of the same; and it further comprises certain novel features of construction and arrangements of parts; all as more fully hereinafter set forth and as claimed.

This invention relates particularly to feed troughs for use in combination with silo pits, or pit silos. In the construction of silos, it is important that the ensilage be kept in an air tight condition, protected from atmospheric access, except at the top, or from that part from which the fodder is being removed. A common form of silo is that which is referred to herein as the pit silo, which is in the form of a submerged pit into which the ensilage can readily be dumped without special elevating mechanism such as is necessary with silos extending a considerable distance above the ground. The filling of such pit silos presents no particular difficulties; but the removal of the ensilage therefrom, where such pits extend a considerable distance below ground and are of considerable size, presents peculiar difficulties. It is important that the ensilage be removed only in small amounts as desired; but that when desired, the removal of the desired amount shall be easily effected. The novel elevating feed trough of the present invention, when used in connection with such a submerged silo, enables this result to be readily obtained.

I will now proceed to describe my invention in connection with one of the simplest embodiments thereof illustrated on the accompanying drawings, it being intended and understood that the invention is illustrated by, but is not limited to, the specific embodiment thereof so illustrated and described.

The accompanying drawing shows, partly in section, and in perspective, a preferred embodiment of the invention.

In this figure, many of the parts are shown diagrammatically, in order that the construction and operation may be more readily understood. The pit silo is shown at 1 as of concrete or cement construction, or of wood or other suitable material. Where the surrounding earth is protected, as where the silo is covered by a roof, or is inclosed in a barn or other building, the exclusion of moisture and of water may not present any particular problem. When however the silo is out of doors, its construction should advantageously be such as to exclude sub-soil moisture. Waterproof concrete or cement, or other suitable material can be used. The size of such pit will vary within rather wide limits depending upon the amount of ensilage which is to be contained within it.

The pit may extend for a considerable distance below the surface of the ground and may vary considerably in diameter. It may also be square or rectangular in shape although the round form has been found most advantageous. In the drawing the silo is illustrated as extending above the ground, as at 2, and as having an upper edge 3 at a suitable height to prevent animals from accidentally falling into the silo. The surrounding earth is indicated at 5 and suitable abutments 6 and 7 on opposite sides of the silo are shown from which extend the supporting bars 8 and 9 supporting at their upper ends a cross-bar 10. These supporting bars may be of any suitable or preferred construction, but are shown as angle irons. It will be understood that the cross bar 10 is at a suitable distance above the ground, and that this distance may be varied as desired.

At the center of the cross bar 10 is shown a bracket 11 which serves as a support for the pulley 22 and for centering the guide rod 12. This guide rod serves to center and guide the feed trough indicated as a whole at 14, and in the particular embodiment of the invention illustrated this feed trough has a central sleeve 19 slidable up and down on the guide rod 12. This guide rod may extend to the bottom of the silo and may have other forms and arrangements than that shown, its function being to center and guide the feed trough during its raising and lowering. The feed trough 14 is shown as made up of sections 15 bolted together and having division plates 16. The annular trough is thus made up of sections separate from each other. These sections can be made larger or smaller as desired, and are made of suitable size and shape and material. Four diagonally arranged supporting rods 17 connect the upper end of the sleeve 19 with the feed trough, and four corresponding arms or irons 18 space the lower end of the trough from the lower end of the central sleeve 19. The trough is thus rigidly connected with the central sleeve or guide 19 so that, as this sleeve slides on the guiding rod 12, the trough will be suitably guided and held from binding against the side of the silo. The annular trough will normally slide up and down without hitting the sides of the silo, and suitable clearance between the silo and trough will in practice be provided for this purpose. In order to raise and lower the trough a suitable raising and lowering device is illustrated diagrammatically, this device consisting of the rope 21 attached at 20 to the upper end of the sleeve 19 and passing over the pulley 22. At its other end it is fastened to the windlass 23 which is shown as provided with an operating arm 24 and with a pawl 25 acting upon a suitable ratchet wheel. The construction and operation of such windlass is well known and is not illustrated in detail. By moving the arm 24 back and forth the drum will be rotated and the rope 21 wound thereon, thus raising the trough. The form of the pulley 22 and of the windlass 23 can be varied, and a simple form of pulley and windlass are shown merely for purposes of illustration, in order that the principle of operation may be more clearly understood. It will be understood that when pulleys having more than one block are used the necessary force for operation will be correspondingly less. It will also be understood that when the pawl 25 is released the rope 21 will also be released and the trough will be permitted to fall. A suitable supporting platform for the windlass and operator is shown at 26. The size of this platform will necessarily vary with the size of the trough and silo, and may extend only a short distance from the central shaft or may occupy a larger sector as shown. In order to illustrate the principle of operation of the invention a small amount of ensilage is shown at 4 at the bottom of the silo. The raising of this ensilage from a depth many feet below the ground is at present a difficult problem. By the use of the elevating trough of the present invention however this ensilage can readily be elevated for use as desired. The annular trough may conveniently be kept, when not in use, at the top of the silo. When it is desired to obtain the ensilage for use as fodder, the operator can readily stand upon the platform 26 and release the windlass and thereby permit the trough to be lowered until it rests upon the ensilage. It can however be arrested before it reaches this position. The operator can then readily shovel or pitch the ensilage into the annular trough, the open space inside the annular trough permitting ready access to the ensilage. The trough moreover can be rotated about its guiding shaft 12 so that in large silos the fodder can be obtained from any desired part of the silo and placed in any particular part of the annular trough. It will be understood that when the trough is lowered, it can be easily rotated into the desired position. Now when the fodder has been placed in the annular trough, the operator can raise himself and the trough and fodder by operating the windlass 23 until the trough is at the top of the silo or at the desired elevation. With the silo extending above the surrounding ground, and with the trough at the top of the silo, this trough forms a convenient feed trough from which the fodder can be directly fed. The extension 2 above the ground prevents the cattle or sheep from falling into the silo and enables the trough to be raised to a convenient height for feeding purposes.

From the above description it will be understood that the invention is of general application in connection with pit silos of different sizes and of varying depths.

It will also be understood that the details of construction can be varied from those illustrated and described without departing from the spirit and scope of the invention.

By means of the present invention the feeding of ensilage as fodder can be readily effected, the annular trough serving both as a means for elevating the fodder from a greater or less depth in the silo and as a feed trough from which the fodder can be directly consumed by the stock.

In order to protect the contents of the silo a suitable cover (not shown) may be provided, or a suitable roof (not shown). The silo can moreover be inclosed within a building which will protect the animals using the trough as well as the silo and its contents. By making the trough of sections bolted together, it can be readily taken apart and put together, when the silo is empty and the fodder is to be placed in it. This however will not always be necessary since the trough can be raised to its highest position or even out of the way, and when in a lowered position the ensilage can be charged into the silo through the open central portion. The pit silo can thus be charged in the usual way and the removal of the ensilage when desired for feeding purposes can be readily effected.

I claim:—

1. In combination, a pit silo, a feed trough conforming generally in shape to the shape of the silo and having an open central portion, and means for raising and lowering said trough in said silo.

2. In combination, a pit silo, a feed trough conforming generally in shape to the shape of the silo and having an open central portion, means for raising and lowering said trough in said silo, and means for centering and guiding said trough when raised and lowered.

3. In combination, a circular pit silo, an annular feed trough adapted to be raised and lowered therein, and means for raising and lowering said trough in said silo.

4. In combination, a circular pit silo, an annular feed trough adapted to be raised and lowered in said silo and having an open central portion, a central shaft for centering and guiding said feed trough, and means in connection with said trough and silo for raising and lowering the trough.

5. In combination, a circular pit silo, an annular feed trough adapted to be raised and lowered in said silo, a central guide shaft for centering and guiding said trough, means in connection with said shaft and trough for holding the trough in proper relation with respect to said shaft, and means for raising and lowering said trough in the silo.

6. In combination, a circular pit silo, an annular feed trough therein having an open central portion, a suitable pulley arranged above said silo, a central shaft for centering and guiding said feed trough, a flexible cable connected to said trough and pulley for raising and lowering the trough, and means carried by said trough for operating said cable.

7. In combination, a pit silo extending above the level of the surrounding ground, a feed trough therein adapted to be raised and lowered and having an open central portion, means for guiding and centering said trough in said silo, and means for raising and lowering said trough to the top of the silo.

8. In combination, a circular pit silo, an annular feed trough, adapted to be raised and lowered therein and having an open central portion, a centrally disposed guiding member, spacing bars for spacing said trough from said member, a pulley above said silo, and a windlass carried by said trough for raising and lowering the same in said silo.

9. An annular feed trough for pit silos comprising an annular trough made up of sections bolted together, a central guide member adapted to center and space said trough when used in said silo, spacing bars and supporting bars for spacing and supporting said trough from said central member, and means in connection with said trough whereby the same may be raised and lowered in said silo.

In testimony whereof I affix my signature in the presence of two witnesses.

NOAH D. WILLIAMS.

Witnesses:
CLIFFORD SHAW,
E. E. HUFF.

Copies of this patent may be obtained for five cents each, by addressing the "Commissioner of Patents, Washington, D. C."